(12) United States Patent
Jansen

(10) Patent No.: US 8,573,245 B1
(45) Date of Patent: Nov. 5, 2013

(54) FUEL MANIFOLD FOR TURBINE

(75) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 172 days.

(21) Appl. No.: 13/282,705

(22) Filed: Oct. 27, 2011

Related U.S. Application Data

(60) Provisional application No. 61/407,539, filed on Oct. 28, 2010.

(51) Int. Cl.
*F16K 3/36* (2006.01)

(52) U.S. Cl.
USPC ............. 137/240; 137/312; 137/597; 251/62; 60/739

(58) Field of Classification Search
USPC ............... 137/240, 312, 597, 596.14, 625.48; 251/62–63.6; 60/734, 739, 740, 741, 60/39.094
See application file for complete search history.

(56) References Cited

U.S. PATENT DOCUMENTS

| | | | | |
|---|---|---|---|---|
| 2,631,001 | A | * | 3/1953 | Griswold ...................... 137/312 |
| 3,590,839 | A | * | 7/1971 | Moore ............................ 137/71 |
| 3,713,458 | A | * | 1/1973 | Lee ................................ 137/312 |
| 4,579,143 | A | * | 4/1986 | Rollins et al. ............. 137/625.48 |
| 5,172,719 | A | * | 12/1992 | Dawawala et al. ........ 137/315.01 |
| 5,232,007 | A | * | 8/1993 | Martin ........................ 137/15.01 |
| 6,050,081 | A | | 4/2000 | Jansen et al. |
| 6,729,135 | B1 | | 5/2004 | Norris et al. |
| 6,931,831 | B2 | | 8/2005 | Jansen |
| 7,269,939 | B2 | * | 9/2007 | Kothnur et al. ............. 60/39.281 |
| 7,721,521 | B2 | * | 5/2010 | Kunkle et al. .............. 60/39.094 |
| 8,104,258 | B1 | | 1/2012 | Jansen |
| 2007/0245744 | A1 | * | 10/2007 | Dooley ........................... 60/772 |
| 2008/0290313 | A1 | * | 11/2008 | Larsen .......................... 251/337 |

* cited by examiner

*Primary Examiner* — Craig Schneider
*Assistant Examiner* — Jessica Cahill
(74) *Attorney, Agent, or Firm* — Quarles & Brady LLP

(57) ABSTRACT

A fuel manifold for turbine engines, such as the large turbines used for generating electrical power, has a housing with straight internal porting for routing fuel and purge media streams to the combustion area of the turbine. A pressure balanced fuel valve regulates fuel using a poppet actuator. A piston section of the actuator dynamically seals off actuation pressure from the fuel. A valve section of the actuator dynamically seals off a vented area from the fuel and regulates fuel flow through the valve. The piston section has internal porting to a collector tube within the vented area for directing media leaked past the piston seal(s) to a vent port, and thereby prevent mixing of the fuel and actuation media.

15 Claims, 3 Drawing Sheets

FUEL MANIFOLD FOR TURBINE

CROSS-REFERENCE TO RELATED APPLICATION(S)

This application claims benefit to U.S. Provisional Application No. 61/407,539, filed Oct. 28, 2010.

STATEMENT OF FEDERALLY SPONSORED RESEARCH OR DEVELOPMENT

Not applicable.

BACKGROUND

1. Technical Field

The present disclosure relates to fuel control devices, and in particular, to fuel manifolds and valves for turbines.

2. Discussion of the Art

Turbine engines have a set of rotating turbine blades that compress air into the combustion area where fuel is injected and ignited. Fuel is delivered through metering orifices to burners in the combustion chamber under pressure through a fuel line. Combustion of the fuel turns a downstream set of blades from which energy is extracted and which can also be used to drive the compressor blades. The combustion area of the turbine can be divided by and contained in combustion cans. There are anywhere from six to eighteen such cans in modern turbine systems used to generate power. Each can has a burner to ignite the fuel as well as injectors for injecting the fuel into the can for combustion. Typically, some of the injectors are designated as primary injectors and one or more are secondary injectors. The primary injectors are used during the start-up sequence and at periods of lower fuel consumption, but otherwise both the primary and secondary injectors are used during normal operation of the turbine, each with several burner nozzles that ignite the fuel at light-off and sustain combustion during operation. A large manifold is ordinarily used to contain and route fuel to the various injectors of the combustion cans.

The combustion cans of the turbine are high pressure and temperature environments. It is typical for the environment surrounding the combustion cans to reach temperatures of 400° F., and for the combustion chamber temperature to near 2,000° F. The liquid fuel is consumed at a rate of about 20 gallons per minute at a high fuel pressure of about 1200 psig. This extreme environment is very hard on the fuel control components of the turbine fuel system, particularly for dual fuel turbines in which during sustained gaseous burn, the liquid fuel system remains inoperable for long periods of time.

A principal concern is the formation of the coke, or the tarry deposits left after the distillate or volatile components of the fuel are driven off by heat, on the metering orifices and other working surfaces of the liquid fuel control components. Coke deposits arise primarily from the presence of residual fuel left in the convoluted passages and dead spaces present in fuel atomizer, burner nozzles, control valves, fuel manifolds and other components subjected to the high heat of combustion. Residual liquid fuel left in the liquid fuel control components during gaseous operation will begin to coke at temperatures of about 250-280° F. in the presence of oxygen, which are well under the combustion temperature.

To reduce the effects of coking liquid fuel can be circulated through a heat exchanger to cool the temperature of the liquid fuel distillate to below the coking threshold temperature during operation of the turbine in gaseous fuel mode, see U.S. Pat. No. 6,729,135. However, this system requires a heat exchanger and either a separate fuel recirculation pump or increased duty on the main fuel pump. Moreover, because the recirculation lines carry liquid fuel, these lines, along with any recirculation control components, present yet another location for coking to occur when the recirculation system is not operating. To avoid this, during liquid fuel operation some of the liquid fuel must be made to bypass the combustor to flow through the recirculation system.

Dedicated cooling circuits can be used which avoid the aforementioned problems with using fuel as the coolant. However, this too can be problematic if not properly monitored and controlled. For one thing, if the coolant runs too hot, then adequate cooling may not be achieved such that components may undergo the coking problem discussed above. Also, if the coolant were to leak, otherwise flow at an insufficient rate, not only could coking occur, but in the event of a leak in which coolant is sprayed onto the turbine, could result in "turbine rub", a condition in which housing components of the turbine shrink or contract from cooling caused by the leak and interfere with the turbine blades. If left unchecked, turbine rub can cause significant damage to the large, rotating turbine blades and render the turbine inoperable. Further, if the coolant were to run too cold, for example if at an excessive flow rate or supply conditions were at an insufficient temperature, then the coolant could actually reduce the fuel temperature sufficiently to cause "waxing", a condition in which the fuel media, such as diesel fuel, begins to turn into a paraffin material. This condition disrupts the fuel delivery system and can similarly render the turbine inoperable. In addition to the waxing problem, excessively cold coolant can interfere with the proper operation of other components or sub-systems, for example, fogging of optical pyrometer.

Alternatively, the liquid fuel line components can be purged with air, water or other suitable media. However, in order to permit purging of the liquid fuel line a purging line must join with the fuel line. It is important that the fueling and purging operations be isolated so that fuel does not go down the purge line and hot gases do not travel up the fuel line to the fuel supply. A three-way purge valve for this purpose is disclosed in U.S. Pat. No. 6,050,081. Such a purge valve is significantly more reliable than simple check valves for preventing backwash and is more resistant to coking. As disclosed, a spool valve having an enlarged middle section was used to shuttle between positions alternatively blocking the combustion can from either the purge air line or the fuel line. The spool is biased to close off the fuel line and is urged to open the fuel line by a pilot air actuated piston. Thus, when fuel is to be closed off from the engine, the spool valve will return to its initial position thereby allowing the burner nozzles and the downstream side of the spool to be purged to reduce or eliminate coking in these areas.

To avoid the need to use dedicated purge valves for each injector, a separate distributor can be mounted to each combustion can to act as a manifold to which the several fuel lines connect before the fuel is routed to the individual injectors. This additional component and additional lines add significant cost, assembly and size to the system. And, these parts create additional areas for coking to occur, particularly given that the distributor is typically mounted directly to the combustion can which realizes extreme temperatures during combustion. A distributor three-way purge valve is disclosed in U.S. Pat. No. 6,931,831 that addresses the aforementioned problem by combining the functionality of the three-way purge valve with that of a distributor in a single unit.

While these valves provided a significant improvement to turbine fuel systems, such distributor valves are not designed to work with conventional fuel manifolds. Thus, coking and cross-contamination of fuel and purge media remain concerns for conventional fuel manifolds.

BRIEF SUMMARY

The disclosure relates to a fuel manifold for a turbine engine, such as the large, industrial turbines used for generating electrical power. The manifold has internal porting for both fuel and purge media streams. The porting provides straight passages to minimize plugs and eliminate pockets of dead space that more readily succumb to the aforementioned coking problem. The manifold contains one or more fuel valves, and can contain other valves for pressurizing or segregating flow streams within the manifold. The manifold can be packaged with a small form factor by using pressure balanced fuel valves according to the present disclosure.

Specifically, in one aspect the disclosure provides a fuel manifold having a housing with an internal fuel passageway defining a straight passage between a fuel inlet and fuel outlet. The housing can also have an internal purge passageway intersecting the fuel passageway. The purge passageway defines a straight passage from a purge inlet of the housing. The manifold can provide fuel routing to numerous ports, such as numerous primary and/or secondary fuel inlet and outlet ports. For example, the manifold can provide routing being a main fuel inlet and outlet as well as one or more pilot fuel inlet and outlet ports. In each case, each fuel passageway defines a straight passage between the associated fuel inlet(s) and outlet(s). Multiple straight purge passageways can also be provided.

The housing can contain a fuel valve within, or in communication with, one or more fuel passageways to regulate flow from the fuel inlet to the fuel outlet. The housing can also contain one or more check valves at the intersection of one or more fuel and purge passageways to regulate flow to the fuel outlet from either the fuel inlet or the purge inlet of the housing.

The fuel valve can have a valve body containing a poppet actuator. The valve body can define a main passageway communicable with fuel inlet and outlet ports in communication with the fuel passageway of the housing, an actuation pressure area communicating with a pressure port, and a vented area communicating with a vent port. The poppet actuator can be disposed within the valve body for reciprocal movement along a stroke axis. The poppet actuator can have a piston section and an annular valve section. The piston section can create a dynamic seal between the actuation pressure area and the fuel inlet and outlet ports. The valve section can create a dynamic seal between the vented area within the poppet actuator and the inlet and outlet ports and create a static seal between the inlet port and the outlet port when the fuel valve is in a closed position. The piston section can have internal porting leading from an entry orifice to an exit orifice.

The sealing arrangement of the fuel valve allows for pilot air actuation of the poppet. Also, a first seal which provides the dynamic seal at the piston section and a second seal which provides the dynamic seal at the valve section, can have essentially identical effective surface areas such that the poppet actuator is pressure balanced so as to be essentially unaffected by pressure in the main passageway between the inlet and outlet ports. The balanced valve can be considerably smaller than unbalanced valves, thereby reducing the overall package size of the manifold.

Also, the fuel valve can have a collector tube component, which can be disposed within the vented area along the stroke axis. The collector tube can have an internal passageway communicating the poppet exit orifice with the vent port of the valve body. The collector tube can be passively mounted within the valve body. For example, the collector tube can have an enlarged base for stabilizing the collector tube within the main passageway of the valve body. A return spring can provide a force opposing the actuation pressure, such as by contacting the poppet actuator, and by contacting the collector tube, retain it in place. There can also be multiple return springs, such as in a parallel force arrangement, in which one of the return springs contacts the enlarged base of the collector tube at one end and the poppet actuator at the other end. Moreover, the collector tube can have a spring retainer, for example so that a second return spring can contact the spring retainer and resist movement of the poppet actuator.

These and still other advantages will be apparent from the following detailed description of the drawings. To assess the full scope of the invention the claims should be looked to as the construction(s) shown in the drawings and described below are not limiting.

DETAILED DESCRIPTION OF THE DRAWINGS

Figure 1:
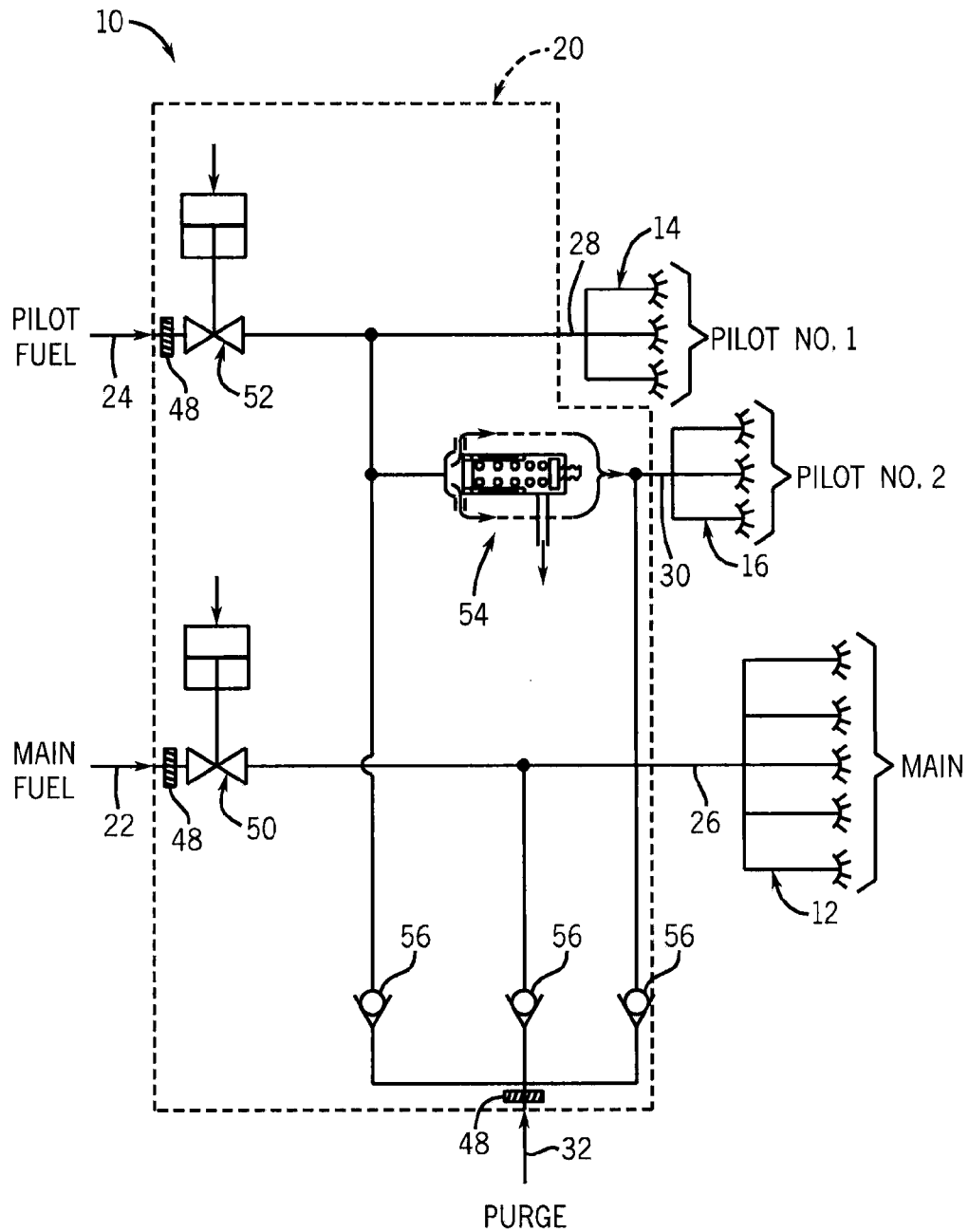
FIG. 1 is a schematic representation of a fuel manifold for a turbine engine according to the present disclosure.

The following is a description of an example fuel manifold and fuel valve construction for use in modern power generating turbine engines according to the present disclosure. FIG. 1 illustrates schematically a fuel manifold for the delivery of fuel to a combustion can of the turbine engine. Modern large-scale power generating turbines often have 14-18 combustion cans such that each of the combustion cans would have an associated fuel manifold.

FIG. 1 illustrates one such fuel manifold 10 for use with a combustion can having a main burner 12 and two auxiliary burners, namely pilot burners 14 and 16. Each of the burners includes a plurality of atomizers 18, which break up and distribute the fuel prior to combustion. In this example then, the fuel manifold 10 has a housing 20 with a main fuel inlet 22 and a pilot fuel inlet 24, both suitably coupled to lines leading from a source of fuel (not shown), such as distillate, a distillate mixture or natural gas. The manifold housing 20 also has a main fuel outlet 26 and first 28 and second 30 pilot fuel outlets. The main fuel inlet 22 and main fuel outlet 26 work to direct fuel, via suitable lines (not shown) to the main fuel burner 12, and the pilot fuel inlet 24 and the first 28 and second 30 pilot fuel outlets work to direct fuel to the respective pilot burners 14 and 16. The manifold housing 20 also has a purge inlet 32, suitably coupled to a line leading from a suitable purge media source (not shown), such as water or air. The purge inlet 32 can be placed into communication with the main fuel outlet 26 and the first 28 and second 30 pilot fuel outlets during a purging operation, for example, which may be initiated during an emergency shut-down of the turbine or when converting from liquid to gaseous fuel in a dual-fuel turbine system.

Figure 2:
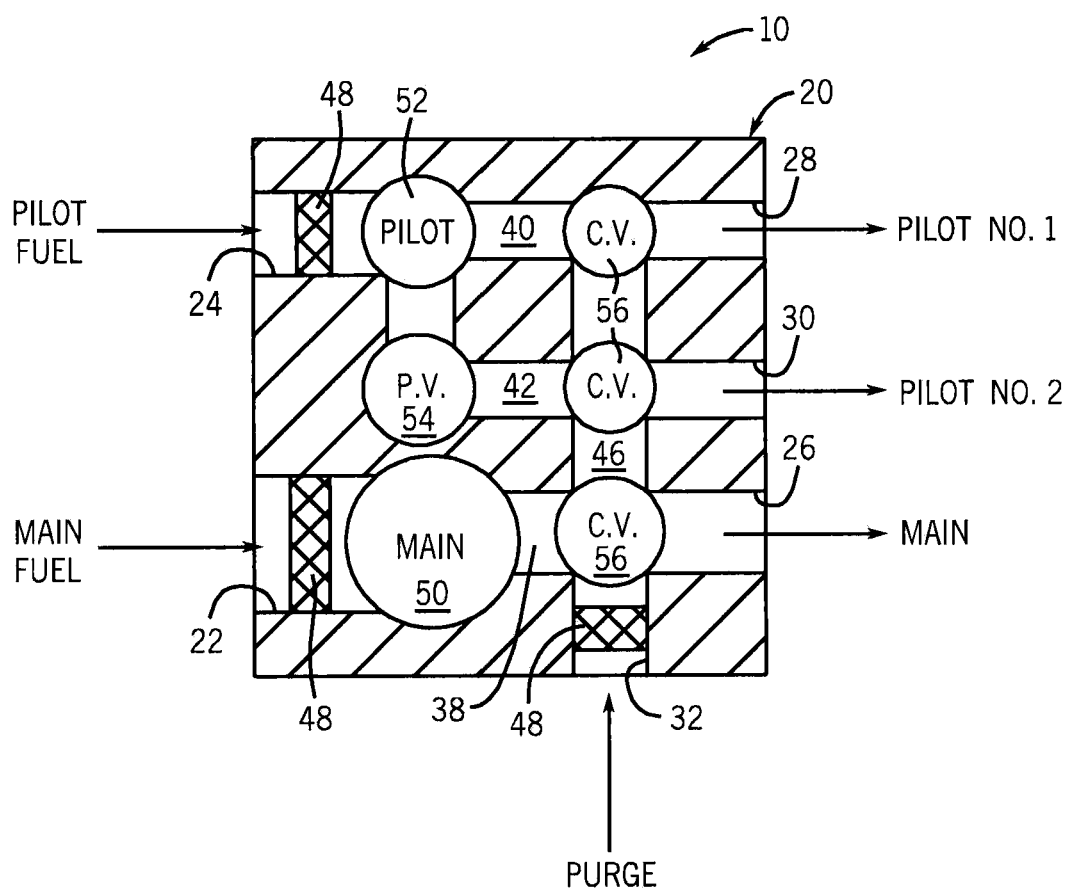
FIG. 2 is a diagrammatical view showing an example package layout of the fuel manifold of FIG. 1.

With continued reference to FIG. 1 and also referring to FIG. 2, the fuel manifold 10 can have a compact size and can be made of a corrosion resistive material, such as stainless steel. The manifold housing 20 can include internal porting with straight passages that join the various inlets and outlets described above. The straight passages eliminate dead pockets or cavities within the manifold that would otherwise be susceptible to coking because of residual fuel gathering or being trapped there during a purging operation. The straight passages also facilitate servicing of the working components within the manifold 10 in an individual or modular manner by allowing them to be pulled from the manifold separately. The layout of the passages also minimizes or eliminates the use of plugs that complicate assembly and present additional areas for coking.

More specifically, a main passage 38 can pass straight through the housing 20 to join the main fuel inlet 22 to the main fuel outlet 26. If necessary, such as to accommodate different sized working components, the main passage 38 can vary in dimension between the associated inlet and outlet, such as having a larger internal diameter at the inlet than at the outlet. The transition between the varied dimensions can be stepped or have a smooth round or straight taper. A pilot passage 40 can also pass straight through the housing to join the pilot fuel inlet 24 to the first pilot fuel outlet 28. As with the main passage 38, the pilot passage 40 can have a consistent dimension or a varied dimension between the associated inlet and outlet with a stepped or smooth transition therebetween. A second pilot passage 42 can pass straight from the second pilot fuel outlet 30 to an internal transfer passage 44 that passes straight to the pilot passage 40. Although not shown in FIG. 2, the transfer passage 44 can be formed by drilling into the housing 20 straight through to intersect the second pilot passage 42 and then plugging the entry opening so that the transfer passage 44 is contained internally within the manifold housing 20. Finally, a purge passage 46 can pass straight from the purge inlet 32, intersecting the main 38 and pilot 40 passages and terminating at the second pilot 42 passage without passing through to the opposite side of the manifold housing 20. Again, the passages 42, 44 and 46 can be consistent or varied in size with any suitable stepped or smooth transition in the latter case.

Figure 3A:
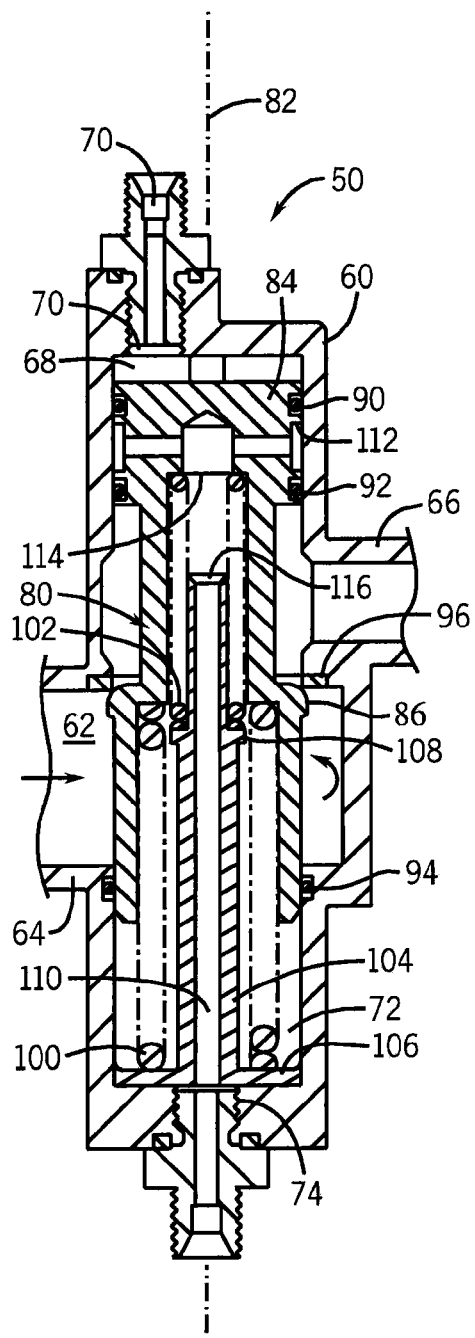
FIG. 3A is a sectional view of a fuel valve incorporated into the fuel manifold of FIG. 1 shown in a closed position.
Figure 3B:
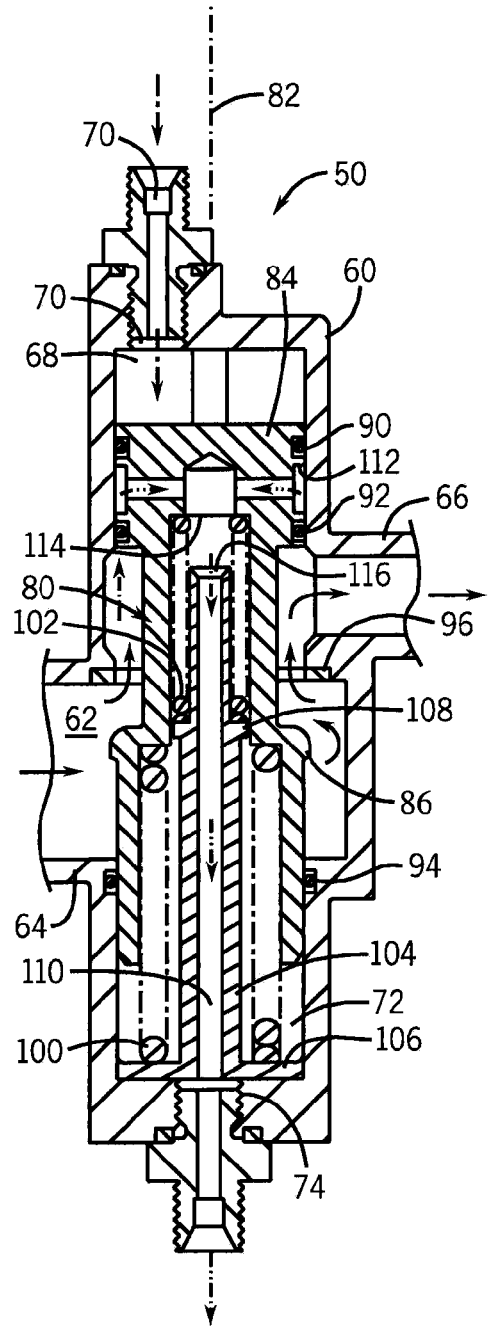
FIG. 3B is a sectional view of the fuel valve shown in FIG. 3A in an open position.

As shown in FIGS. 1 and 2, the manifold housing 20 contains a number of operational components to control the routing of fuel and purge media streams through the manifold 10 and onto the burners 12-16 of the turbine. At each of the inlets, namely the main fuel inlet 22, the pilot fuel inlet 24 and the purge inlet 32, there can be a porous membrane or strainer disk element 48 to collect contaminants in the incoming fuel or purge media while permitting transmission of the bulk fluid into the manifold housing 20. For example, conventional strainers having a nominal rating of the order of 200 microns are generally suitable for common fuel and purge media. In each of the main passage 38 and the pilot passage 40 is contained a fuel control valve, namely a main fuel valve 50 and pilot fuel valve 52. Both valves 50 and 52 can be pressure balanced valves with integral actuation elements. Moreover, both valves 50 and 52 can have the same construction, but may be made of components of different relative sizes or materials according to the capacity required during operation. For example, the main fuel valve 50 may operate in the range of 40-50 gallons per minute while the pilot fuel valve 52 may operate in the range of 5-10 gallons per minute. Consequently, the component parts of the pilot fuel valve 52 may be of smaller and/or lighter construction than the main fuel valve 50. An example construction of the fuel valve 50 (and thus fuel valve 52) is shown in FIGS. 3A and 3B, which are described in detail below.

The fuel manifold 10 can also contain a pressurizing valve 54 within the second pilot passage 42 for use in the case where the turbine has a second pilot burner 16 with a variable flow atomizer. The pressurizing valve 54 can be a conventional passive valve, such as a spring-biased piston check valve. The pressurizing valve 54 is spring-loaded closed to delay delivery of fuel to the second pilot burner 16 as well as to increase the pressure of the fuel therein. For example, fuel flow to the second pilot burner 16 can begin after a threshold crack pressure, such as 150 psid, is reached. Further, although not shown, a mechanism may be coupled to the pressurizing valve 54 for adjusting the crack pressure from outside the manifold housing 20 to better facilitate pressure and timing control over the variable pilot burner 16.

Additional flow control valves, such as conventional passive check valves 56, are included in the purge passage 46 at the intersections with the main 38, pilot 40 and second pilot 42 passages. The check valves 56 are configured to be biased closed, with further biasing provided by the fuel flow through the main 38, pilot 40 and second pilot 42 passages. The check valves 56 thus ensure that fuel flows to the main 26, first pilot 28 and second pilot 30 outlets. Only upon cessation of fuel flow will the flow of purge media drive the check valves 56 open to allow purge media to flow to the main 26, first pilot 28 and second pilot 30 outlets, as well as upstream through the internal passages and components of the fuel manifold 20. As mentioned, such a purge operation would normally be initiated during or after emergency shut-down of the turbine or conversion to gaseous fuel operation in dual fuel turbines. It should be noted that for greater control over the segregation of the fuel and purge media streams, the check valves 56 could be replaced by actively controlled valves, such as air actuated on/off valves.

The construction of the fuel manifold 10 and its conventional components have been described above. With reference to FIGS. 3A and 3B, the construction of the fuel valves 50 and 52 will now be described in greater detail. As mentioned, the fuel valves 50 and 52 can be pressure balanced integrally actuated valves of the same general construction, albeit possibly of different size and material weight based on intended capacity. Therefore, for simplicity, the following description will refer only to the main fuel valve 50.

In particular, the main fuel valve 50 has a valve body 60 defining an internal main passageway 62 that communicates with fuel inlet port 64 and fuel outlet port 66. The fuel inlet 64 and outlet 66 ports, and thereby the main passageway 62, in turn communicate with the main fuel inlet 22, main passage 38, and main fuel outlet 26 of the manifold housing 20. Like the fuel manifold 10 itself, the valve body 60 eliminates dead pockets by ensuring that the wetted surfaces of the valve body 60 form the main flow path of the valve 50, thereby maximizing the efficiency of a purge operation and reducing coking. The valve body 60 also defines an actuation pressure area 68 communicating with a pressure port 70 leading from an external instrument air pressure source (not shown) as well as a vented area 72 communicating with a vent port 74 leading to an external vent (not shown). Both the pressure port 70 and the vent port 74 have fittings that couple the valve 50 to the associated incoming and outgoing lines.

The valve 50 can have a poppet actuator 80 disposed within the valve body 60 for reciprocal movement along a stroke axis 82. The poppet actuator 80 has a piston section 84 and an annular valve section 86. The piston section 84 creates a dynamic seal between the actuation pressure area 68 and the fuel inlet 64 and outlet 66 ports. The valve section 86 creates a dynamic seal between the vented area 72 and the fuel inlet 64 and outlet 66 ports. The valve section 86 also creates a static seal between the fuel inlet 64 and outlet 66 ports when the valve 50 is in a closed position, as shown in FIG. 3A, in which fuel is prevented from passing through the valve 50, and thereby through the main fuel outlet 26 of the manifold housing 20.

The piston section 84 has an enlarged head with two spaced apart circumferential grooves containing seals 90 and 92, which can be elastomeric seals, especially high temperature (e.g., 500° F.) elastomeric seals. Seals 90 and 92 each work to provide the aforementioned dynamic seal of the fuel from the actuation media. A similar seal 94 is disposed in a groove in the inner diameter of the valve body 60 and creates the aforementioned dynamic seal of the fuel from the vented media. The aforementioned static seal of the fuel between the inlet 64 and outlet 66 ports can be provided by a seal 96, which can be one or more metal crush washers. Thus, the static seal can be a metal-to-metal type seal that is bubble tight for liquids or gases at high temperatures (e.g., 1,200° F.).

The seals 90 and 92 providing the dynamic seal at the piston section 84, the seal 94 providing the dynamic seal at the valve section 86, and the seal 96 providing the static seal at the valve section 86 all have essentially identical effective surface areas. Thus, the poppet actuator 80 is entirely pressure balanced throughout the entire stroke, and thus essentially unaffected by pressure in the main passageway 62 between the fuel inlet 64 and outlet 66 ports. More specifically, the poppet actuator 80 is balanced in the closed position shown in FIG. 3A by virtue of seals 94 and 96 having essentially the same area, and the poppet actuator 80 is balanced when the valve 50 is open, as shown in FIG. 3B, by virtue of seals 90, 92 and 94 having essentially the same surface area. The pressure balancing allows for significant reductions in the size of the valve 50, and thereby the manifold 10, as well as significantly increases the efficiency of the valve 50.

The poppet actuator 80 is biased in the closed position of FIG. 3A by a return spring arrangement, including first 100 and second 102 return springs in a nested, parallel force configuration, and is located in part within an internal cavity of the poppet actuator 80. The return springs 100 and 102 are supported by a collector tube 104. Return spring 100 extends between an enlarged base 106 of the collector tube 104 at one end and the poppet actuator 80 at another end. The collector tube 104 also has an integral annular rib that forms a spring retainer 108, which supports one end of the smaller diameter second return spring 102, the other end of which abuts the poppet actuator 80. Thus, the nested spring arrangement works to optimize return force levels within a small space.

The collector tube 104 is generally disposed within the vented area 72 of the valve body 60. The collector tube 104 is passively mounted within the valve body 60 in that it is only held in place by the biasing force of the return springs 100 and 102. The collector tube 104 has an open-ended internal passageway 110 extending through its length and aligned along with the stroke axis 82. In addition, the piston section 84 of the poppet actuator 80 has internal porting leading between an entry orifice 112 and an exit orifice 114. The entry orifice 112 opens to a space between seals 90 and 92. The opening 116 of the passageway 110 of the collector tube 104 communicates the poppet exit orifice 114 to direct any leaked fuel or actuation media to the vent port 74 of the valve body 60 (see arrows in FIG. 3B) to both prevent entrainment of the actuation media in the fuel as well as to keep fuel from getting in the actuation media stream. Any such leakage can be routed to a collection area (not shown) external to the manifold 10. Also, any leakage of fuel into the vented area 72 can be evacuated through the collector tube 104.

It should be appreciated that the above generally describes only one construction of the fuel manifold and fuel control valve. Many modifications and variations to the described construction will be apparent to those skilled in the art, which will be within the spirit and scope of the invention. To ascertain its full scope, the following claims should be referenced.

I claim:

1. A fuel valve, comprising:
   a valve body defining a main passageway communicable with fuel inlet and outlet ports, an actuation pressure area communicating with a pressure port, and a vented area communicating with a vent port;
   a poppet actuator disposed within the valve body for reciprocal movement along a stroke axis, the poppet actuator having a piston section and an annular valve section, the piston section creating a dynamic seal between the actuation pressure area and the fuel inlet and outlet ports, the valve section creating a dynamic seal between the vented area and the fuel inlet and outlet ports and creating a static seal between the fuel inlet and outlet ports when the valve is in a closed position, wherein the piston section has internal porting leading between an entry orifice and an exit orifice;
   a collector tube disposed within the vented area and having an internal passageway communicating the poppet exit orifice with the vent port of the valve body; and
   a plurality of return springs in a parallel force arrangement providing a force opposing the actuation pressure, wherein a first of the return springs contacts at one end an enlarged base of the collector tube and the poppet actuator at another end.

2. The valve of claim 1, wherein the collector tube has a spring retainer and wherein a second of the return springs contacts at one end the spring retainer and the poppet actuator at another end.

3. The valve of claim 1, wherein a seal providing the dynamic seal at the piston section and a seal providing the dynamic seal at the valve section have essentially identical effective surface areas such that the poppet actuator is pressure balanced so as to be essentially unaffected by pressure in the main passageway between the fuel inlet and outlet ports.

4. The valve of claim 1, wherein the collector tube is aligned with the stroke axis.

5. The valve of claim 4, wherein the collector tube is mounted within the vented area of the valve body.

6. A fuel manifold including a fuel valve as recited in claim 1.

7. The manifold of claim 6, including a plurality of said fuel valves and wherein the manifold has a housing defining multiple internal fuel passageways each containing one of the fuel valves, and wherein each fuel passageway defines a straight passage between an associated fuel inlet and an associated fuel outlet of the housing.

8. The manifold of claim 6, wherein the manifold has a housing defining an internal fuel passageway containing the fuel valve, and wherein the fuel passageway defines a straight passage between a fuel inlet and a fuel outlet of the housing.

9. The manifold of claim 8, wherein the manifold defines an internal purge passageway intersecting the fuel passageway, the purge passageway defining a straight passage from a purge inlet of the housing.

10. A fuel manifold, including:
    a fuel valve including:
       a valve body defining a main passageway communicable with fuel inlet and outlet ports, an actuation pressure area communicating with a pressure port, and a vented area communicating with a vent port;
       a poppet actuator disposed within the valve body for reciprocal movement along a stroke axis, the poppet actuator having a piston section and an annular valve section, the piston section creating a dynamic seal between the actuation pressure area and the fuel inlet and outlet ports, the valve section creating a dynamic seal between the vented area and the fuel inlet and outlet ports and creating a static seal between the fuel inlet and outlet ports when the valve is in a closed position, wherein the piston section has internal porting leading between an entry orifice and an exit orifice;

a collector tube disposed within the vented area and having an internal passageway communicating the poppet exit orifice with the vent port of the valve body;

wherein the manifold has a housing defining an internal fuel passageway containing the fuel valve and defining a straight passage between a fuel inlet and a fuel outlet of the housing;

wherein the manifold defines an internal purge passageway intersecting the fuel passageway, the purge passageway defining a straight passage from a purge inlet of the housing; and further including a check valve disposed at the intersection of the fuel and purge passageways to regulate flow to the fuel outlet of the housing from one of the fuel inlet and purge inlet of the housing.

11. A fuel manifold, comprising:

a housing having an internal fuel passageway defining a straight passage between a fuel inlet and a fuel outlet; and a fuel valve contained in the fuel passageway to regulate flow from the fuel inlet to the fuel outlet, the fuel valve including:

a valve body defining a main passageway communicable with fuel inlet and outlet ports in communication with the fuel passageway of the housing, an actuation pressure area communicating with a pressure port, and a vented area communicating with a vent port; and a poppet actuator disposed within the valve body for reciprocal movement along a stroke axis, the poppet actuator having a piston section and an annular valve section, the piston section creating a dynamic seal between the actuation pressure area and the fuel inlet and outlet ports, the valve section creating a dynamic seal between the vented area and the fuel inlet and outlet ports and creating a static seal between the fuel inlet and outlet ports when the valve is in a closed position, wherein the piston section has internal porting leading between an entry orifice and an exit orifice;

wherein the housing includes an internal purge passageway intersecting the fuel passageway, the purge passageway defining a straight passage from a purge inlet of the housing, further including a check valve disposed at the intersection of the fuel and purge passageways to regulate flow to the fuel outlet from one of the fuel inlet and purge inlet of the housing.

12. The manifold of claim 11, further including a plurality of said fuel valves and wherein the housing defines multiple internal fuel passageways each containing one of the fuel valves, and wherein each fuel passageway defines a straight passage between an associated fuel inlet and an associated fuel outlet of the housing.

13. The manifold of claim 11, wherein a collector tube disposed within a collection area along the stroke axis, the collector tube having an internal passageway communicating the poppet exit orifice with the vent port of the valve body.

14. The manifold of claim 11, wherein the fuel valve has a first seal providing the dynamic seal at the piston section and a second seal providing the dynamic seal at the valve section, the first and second seals have essentially identical effective surface areas such that the poppet actuator is pressure balanced so as to be essentially unaffected by pressure in the main passageway between the fuel inlet and outlet ports of the valve body.

15. A fuel manifold, comprising:

a housing having an internal fuel passageway defining a straight passage between a fuel inlet and a fuel outlet; and a fuel valve contained in the fuel passageway to regulate flow from the fuel inlet to the fuel outlet, the fuel valve including:

a valve body defining a main passageway communicable with fuel inlet and outlet ports in communication with the fuel passageway of the housing, an actuation pressure area communicating with a pressure port, and a vented area communicating with a vent port;

a poppet actuator disposed within the valve body for reciprocal movement along a stroke axis, the poppet actuator having a piston section and an annular valve section, the piston section creating a dynamic seal between the actuation pressure area and the fuel inlet and outlet ports, the valve section creating a dynamic seal between the vented area and the fuel inlet and outlet ports and creating a static seal between the fuel inlet and outlet ports when the valve is in a closed position, wherein the piston section has internal porting leading between an entry orifice and an exit orifice; and a collector tube mounted within the valve body and held in place by one or more return springs acting on the poppet actuator.

* * * * *